United States Patent
Voto et al.

(10) Patent No.: US 6,833,657 B2
(45) Date of Patent: Dec. 21, 2004

(54) HEATING ELEMENT FOR FLUORESCENT LAMPS

(75) Inventors: Robert Martin Voto, Noblesville, IN (US); Nicholas David Vergith, Holly, MI (US)

(73) Assignee: Delphi Technologies, Inc., Troy, MI (US)

( * ) Notice: Subject to any disclaimer, the term of this patent is extended or adjusted under 35 U.S.C. 154(b) by 73 days.

(21) Appl. No.: 10/144,324

(22) Filed: May 13, 2002

(65) Prior Publication Data

US 2003/0209960 A1 Nov. 13, 2003

(51) Int. Cl.[7] .................. H01J 61/52; H01K 1/58
(52) U.S. Cl. .................. 313/11; 313/44; 313/635
(58) Field of Search ................. 313/11, 15, 18, 313/33, 37, 38, 44, 45, 46, 47, 489, 635; 315/420; 345/47, 75

(56) References Cited

U.S. PATENT DOCUMENTS

| | | | |
|---|---|---|---|
| 4,882,659 A | 11/1989 | Gloudemans | |
| 4,970,441 A | 11/1990 | Lippmann et al. | |
| 5,079,681 A | * 1/1992 | Baba et al. | 313/15 |
| 5,444,327 A | * 8/1995 | Treseder et al. | 313/37 |
| 5,459,374 A | 10/1995 | Thoeny et al. | |
| 5,469,026 A | 11/1995 | Madsen | |
| 5,473,222 A | 12/1995 | Thoeny et al. | |
| 5,477,430 A | 12/1995 | LaRose | |
| 5,521,449 A | 5/1996 | Tao | |
| 5,613,750 A | 3/1997 | Roe | |
| 5,767,934 A | 6/1998 | Goddard | |
| 5,834,889 A | 11/1998 | Ge | 313/493 |
| 5,856,811 A | 1/1999 | Shih et al. | |
| 6,133,979 A | 10/2000 | Komatsu et al. | |
| 6,153,973 A | * 11/2000 | Shibata et al. | 313/495 |
| 6,163,359 A | 12/2000 | Smith et al. | |
| 6,198,234 B1 | 3/2001 | Henry | 315/291 |
| 6,201,352 B1 | 3/2001 | Ge et al. | 315/169.1 |
| 6,211,612 B1 | 4/2001 | Ge | 313/493 |
| 6,294,883 B1 | 9/2001 | Weindorf | 315/291 |
| 6,310,436 B1 | 10/2001 | Ge et al. | 313/493 |
| 6,316,872 B1 | 11/2001 | Ge et al. | 313/493 |
| 6,428,174 B1 | 8/2002 | Snider | |

FOREIGN PATENT DOCUMENTS

| | | | |
|---|---|---|---|
| DE | 19700807 | 7/1997 | H05B/41/00 |
| JP | 11219612 | 8/1999 | H05B/41/00 |

* cited by examiner

*Primary Examiner*—Vip Patel
*Assistant Examiner*—Sharlene Leurig
(74) *Attorney, Agent, or Firm*—Stefan V. Chmielewski

(57) ABSTRACT

The represent invention relates to a method of backlighting a liquid crystal display which includes heating a fluorescent lamp with an external heating element which does not contact the lamp. The heating step may be accomplished by passing a current through a resistive material. The resistive material may be coated on to a surface. The present invention also relates to a backlighting system with a fluorescent lamp and an external heating element which does not contact the fluorescent lamp. The heating element may be a resistive material coated on a substrate. The present invention also relates to a portable display device element includes a liquid crystal display, a fluorescent lamp to act as a backlight, a heating element which does not contact the fluorescent lamp and optionally including reflectors, diffusers, and optical enhancement films. The heating element may be a resistive material coated on a substrate.

14 Claims, 4 Drawing Sheets

HEATING ELEMENT FOR FLUORESCENT LAMPS

FIELD OF THE INVENTION

This invention relates to a device for providing improved backlighting for liquid crystal displays (LCDs).

BACKGROUND OF THE INVENTION

With the proliferation of mobile and handheld computing devices, the need for these devices to work under a wider range of environmental conditions increases. These devices typically use liquid crystal displays because of they are inexpensive to manufacture in high quantities and high qualities. One particular problem with LCDs is that they can be difficult or impossible to read without additional an light source. For this reason, most LCDs utilize a lamp that is mounted to a circuit board behind the display (hence "backlighting"), although lamps may be mounted in front of the display.

Backlighting may be provided by several different methods including the use of electroluminiscent lamps (ELs), light emitting diodes (LED) and cold cathode fluorescent lamps (CCFL). CCFLs are a popular choice for several reasons including the fact that CCFLs do not produce a large amount of heat for the amount of uniform, bright white light they produce. LEDs are not sufficiently efficient in their light output. CCFLs have a lifetime in the neighborhood of 20,000 to 25,000 hours and unlike ELs, are not sensitive to high humidity. For these reason, CCFLs are the preferred choice for backlighting mobile and handheld LCDs.

One of the drawbacks of CCFLs is that the output or luminance of the lamp drops dramatically as the operating temperature shifts out of the normal operating temperature of the CCFL. For example, below about 0° C. the CCFL would not be able produce enough light to make the LCD readable. In general, a backlight needs to put out roughly 4000 to 4500 candela/m2 (cd/m2) in order for the LCD to be readable. Because LCDs typically attenuate all but 7% of the light put out by the backlight, this out put by the backlight translates into a luminance of the LCD of about 280 to 315 cd/m2.

This is a particular problem for devices that are usually outdoors in colder climates. For example, global positioning system units, gas pumps and automobiles. This is also a problem for a much wider range of devices used in perpetually cold environments such as above the Arctic and Antarctic circles and in outer space. For example, in a LCD in a automobile on a cold winter morning would appear dim and unreadable until the lamp heated up to it normal operating temperature, i.e., room temperature.

One common solution to this problem is to wrap a fine heating element or wire around the CCFL to help raise the temperature of the lamp when the ambient temperature is cold. While this method is effective, it is nonetheless an unsatisfactory solution because of the complexities of wrapping a fine wire around a small diameter CCFL. Such a process is not amenable to high volume production. Consequently, heated CCFLs have been a luxury item until this point. This has limited their use in consumer electronics and prevented them from becoming standard features on automobiles.

Another drawback of wire wrapped CCFLs is that the wire blocks a significant portion of the light of the lamp. To compensate for this loss of light and hence luminance, additional or more powerful lamps must be used, which adds costs to the backlighting system in the display.

Another solution to the problem of unsatisfactory luminance in cold temperatures is the use of self-heating lamps. These lamps utilize gases under high pressure to increase the resistance of the gas, which in turn produces more heat. However, self-heating lamps do not perform well at even moderately elevated ambient temperatures because the temperature of the lamp cannot be easily lowered without turning the lamp off. The elevated temperature causes dimming.

Consequently, the inventors have recognized the need for an improved heated CCFL to overcome one or more of the above discussed problems.

SUMMARY OF THE INVENTION

The represent invention relates to a method of backlighting a liquid crystal display which includes heating a fluorescent lamp with an external heating element which does not contact the lamp. The heating step may be accomplished by passing a current through a resistive material. The resistive material may be coated on to a surface. The present invention also relates to a backlighting system with a fluorescent lamp and an external heating element which does not contact the fluorescent lamp. The heating element may be a resistive material coated on a substrate. The present invention also relates to a portable display device which includes a liquid crystal display, a fluorescent lamp to act as a backlight, a heating element which does not contact the fluorescent lamp and optionally including reflectors, diffusers, and optical enhancement films. The heating element may be a resistive material coated on a substrate.

DETAILED DESCRIPTION

Figure 1:
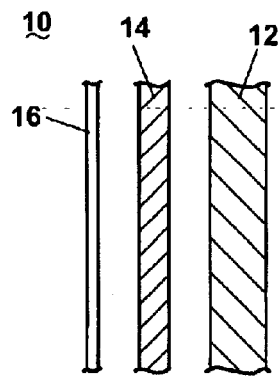
FIG. 1 shows a cross-section of an exploded view of an LCD device including the heating element according to the present invention.

As seen in FIG. 1, the present invention includes a LCD device 10 which includes an LCD 12, at least one cold cathode fluorescent light (CCFL) 14 and heating element 16. In this embodiment, CCFL 14 resides between heating element 16 and LCD 12. The LCD device 10 may include other components, such as mounting substrates, control devices, reflectors, diffusers, and optical enhancement films. Any size and/or shape CCFL may be utilized with this invention. Typically, CCFLs are relatively long and narrow and may be straight, L-shaped or otherwise bent.

The heating element is electrically connected to form a circuit such that a voltage is supplied the heating element.

Typically, the electrical circuit includes a source terminal and a return terminal. Conveniently, the source terminal may be part of a battery or other voltage source such as a wall socket, while the return terminal may be a ground.

In operation, as a voltage is supplied it, the heating element acts as a resistor and radiates heat. The radiated heat raises the temperature of the air around the CCFL, thus raising the temperature of the CCFL. Because the CCFL is placed between the heating element and the LCD, the heating element does not interfere with the light that reaches the LCD. As the CCFL heats up, its light output or luminance increases. The voltage source may be a battery, a generator or any other voltage source.

The heating element is any material which radiates heat when a voltage is supplied to it. In one embodiment, the heating element is attached to a substrate separate from the CCFL. In one useful embodiment, the heating element is a resistive material. In a preferred embodiment, the resistive material is coated on the substrate using polymer thick film (PTF) processes.

In another useful embodiment, the heating element is attached to the CCFL. The heating element, in this embodiment, may be located on the interior or exterior of the CCFL, where the interior refers to the portion of the CCFL which contains the electrified gas. Preferably, a resistive material is coated on the CCFL to form the heating element. Only a portion of the CCFL is covered with the heating element such that the heating element does not substantially block the light that would otherwise reach the LCD. Preferably, the heating element is attached to the CCFL so that it does not block the light that would otherwise reach the LCD.

Heating elements which are capable of providing between 1 and 100 watts of total heat are preferred, although any safe amount of heat may be provided. Because CCFLs are typically long and narrow, heating elements should uniformly heat the entire length of the CCFL. Thus, a heating element which has the capability to heat the air surrounding the CCFL at 0.001 to 2 watt per millimeter of CCFL is desirable, however, any heating capability may be appropriate. Preferred heating elements are capable of heating the CCFL in the range of 0.05 to 0.2 watt/mm.

Any conventional process may be used to attach the heating element to the substrate or CCFL. Further, heating elements which include resistive materials coated on the substrate or CCFL, any conventional PTF process may be utilized. Exemplary PTF processes include intaglio printing, relief printing, screen printing, lithography, electrostatic printing, ink-jet printing, and laser-jet printing. Of these processes, screening printing is preferred because it is cost effective. In addition, multiple layer printing processes may also be utilized.

Resistive materials applied by PTF are electrically connected to a source and a return by applying the resistive material such that it overlaps leads to the respective terminals. The leads may be made of any conventional conducting material such as copper. The leads may be separate from or coated on to the substrate. If the leads are coated on to the substrate or CCFL, a PTF process is preferred.

Figure 2A:
FIG. 2a shows one embodiment of the heating element of the present invention.
Figure 2B:
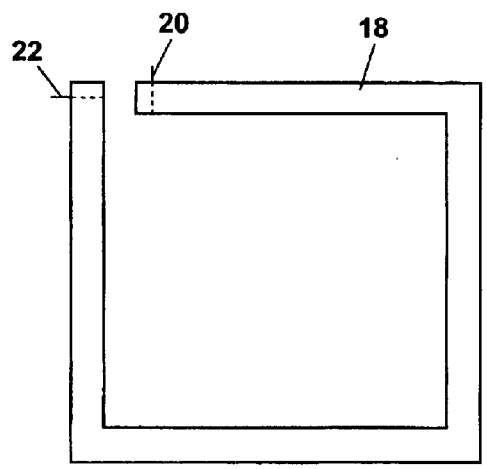
FIG. 2b shows another embodiment of the heating element of the present invention.
Figure 2C:
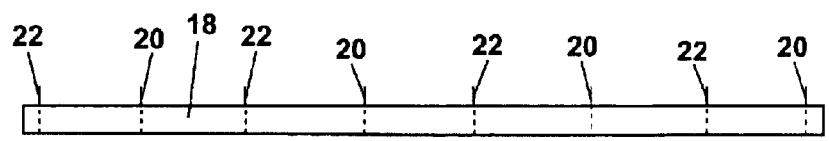
FIG. 2c shows another embodiment of the heating element of the present invention.

In one embodiment, the heating element may be made up of one area 18 of resistive material that is applied to the substrate in a single, linear shape that roughly corresponding to the size and shape of the CCFL to be heated (not shown), as seen in FIG. 2a. This is an economical construction because only a single source lead 20 and a single return lead 22 are required. Alternatively, for two L-shaped CCFLs arranged to form a box, a single box shaped area 18 of resistive material makes up the heating element, which only covers the area under the CCFL may be used, as seen in FIG. 2b. In another embodiment, the entire area of the box may used as the heating element. In addition, a single area 18 of resistive material may utilize multiple source and return leads 20 and 22, respectively, in an alternating pattern., as seen in FIG. 2c. Effectively, this creates several areas of resistive material connected in parallel, which increases the heating capability of the heating element without a corresponding increase in the voltage required of an electrical source. This arrangement eliminates unused space, while also simplifying the design, materials costs and labor costs of manufacturing the heating element.

Figure 3:
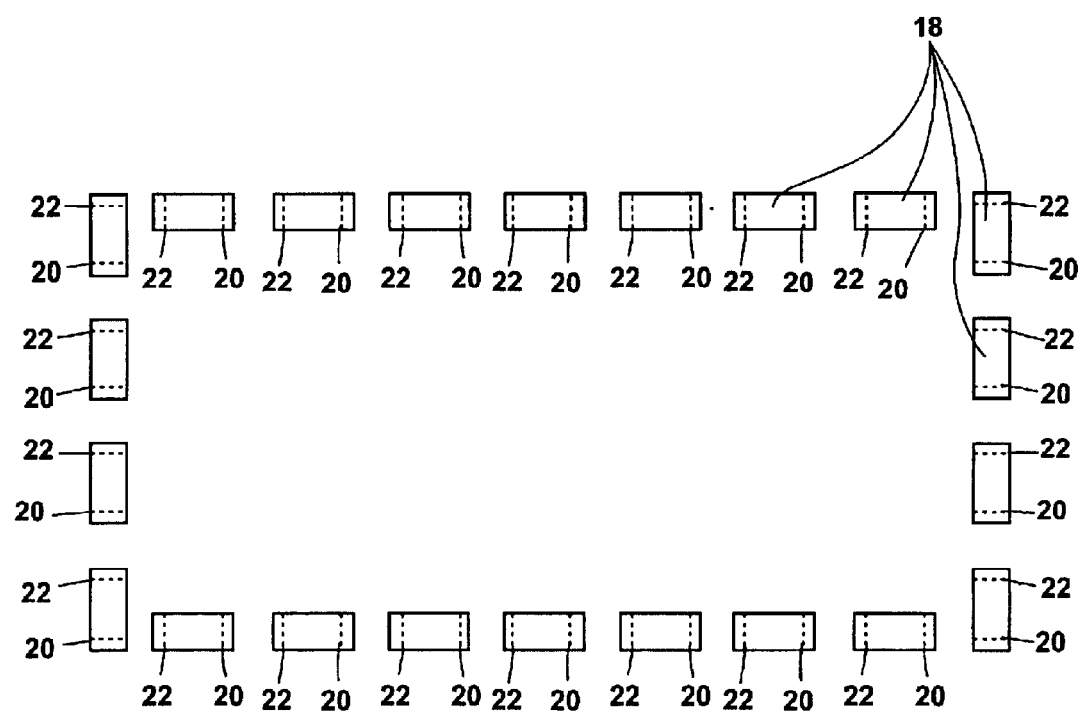
FIG. 3 shows another embodiment of the heating element of the present invention.

As shown in FIG. 3, in another embodiment, the heating element may be made up of two or more areas 18 of resistive material, where the multiple areas of resistive material together roughly correspond to the size and shape of the CCFL to be heated (not shown). Each area of resistive material in this embodiment utilizes a source and a return lead 20 and 22, respectively, connecting the areas of resistive material in parallel.

Figure 4:
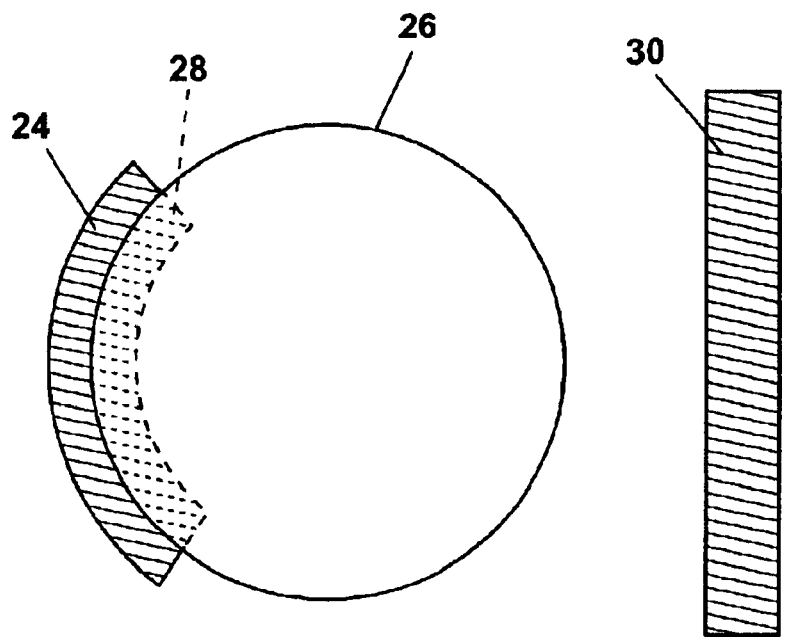
FIG. 4 shows yet another embodiment of the heating element of the present invention.

As shown in cross section in FIG. 4, the heating element may be made up of one or more areas 24 of resistive material coated on to the exterior of CCFL 26. In addition, the heating element may be made up of one or more areas 28 (shown schematically) of resistive material coated on to the interior of CCFL 26. In either case, the heating element should not substantially block light from CCFL 26 that would otherwise reach the LCD 30.

For heating elements which include resistive materials applied by PTF, one useful class of resistive materials include a binder and/or a filler. The binder may be any polymer that serves as electronic resistor. In an alternate embodiment, the binder serves as a material to hold the filler to itself or to a substrate. In this situation, the filler is selected to provided the desire electrical properties. Suitable binders include vinyl, urethane, epoxy, acrylic, and phenolic-based polymers. Thermosetting polymers are preferred because of their stability and wear resistance, while thermoplastics are preferred in situation where low temperature cures are required. Suitable fillers which may act as resistors include carbon, copper, silver or nickel and combinations thereof. Carbon is the preferred filler because of its inexpensive nature.

Resistive materials applied by PTF preferably form linear resistors which obey Ohm's Law. The absolute resistance of a linear resistor, measured in ohms, depends of the nature of the resistive material, measured in ohms/squares/mil, as well as the volume of resistive material, measured in squares/mil. Thus, in addition to the selection of the resistive material based on its resistance characteristics, the geometry of the resistive material is also important. For example, a resistor with a length to width aspect ratio of 2 has a higher absolute resistance than a resistor with an aspect ratio of 1, assuming the thicknesses of the materials are the same.

Selection of suitable resistive materials will be based on two factors: the voltage level of the electric power source which will energize the resistive material; and the desired amount of heat needed to warm the CCFL. From these two values, the required resistance can be calculated. From the value of the required resistance, the type and shape of the resistive material can be selected based on the absolute resistance and volume resistivity of the material.

Suitable resistive materials include those which have a volume resistivity of between 0.01 and 1000 ohms/square/ mil. Preferred resistive materials have a volume resistivity of between 1 and 40 ohms/square. In addition, the area(s) of resistive material are shaped to produce resistors with absolute resistance of, preferably, between 10 and 1000 ohms, with a preferred absolute resistance of between 100 and 200 ohms.

In one aspect of this invention, heating elements may be used in automobiles. Car batteries typically provide voltage in the range of 9 to 16 volts. Thus, to achieve heating in the range of about 1 to 100 watt, resistors with resistances between about 0.08 and 260 ohms need to be utilized.

The LCD device may also include a control device which helps operate the heating element. Besides turning the heating element on and off, the control device may also include a temperature sensor located on, in or near the CCFL to monitor the temperature of the CCFL. For example, the temperature sensor would only allow the control device to activate the heating element when the CCFL was below room temperature or 25° C. The control device may also incorporate any number of safety features such as over current shutdown, temperature sensor failure detection and a temperature failsafe to prevent thermal runaway.

EXAMPLE

As seen in FIG. 3, a heating element including twenty-two areas of resistive material, each with an absolute resistance of 130 ohms, was constructed using PTF application of a carbon resistive material with a volume resistivity of 30 ohms/square and an aspect ratio of 4.3, i.e., a rectangle which 13 mm long and 3 mm wide. Assuming the use of a car battery as the source and it averages 14 volts of output, then each area of resistive material would put out about 1.5 watts, and combined, the set up would put out about 33.2 watts. Consequently, this arrangement would out put about 0.116 watts/mm.

Figure 5:
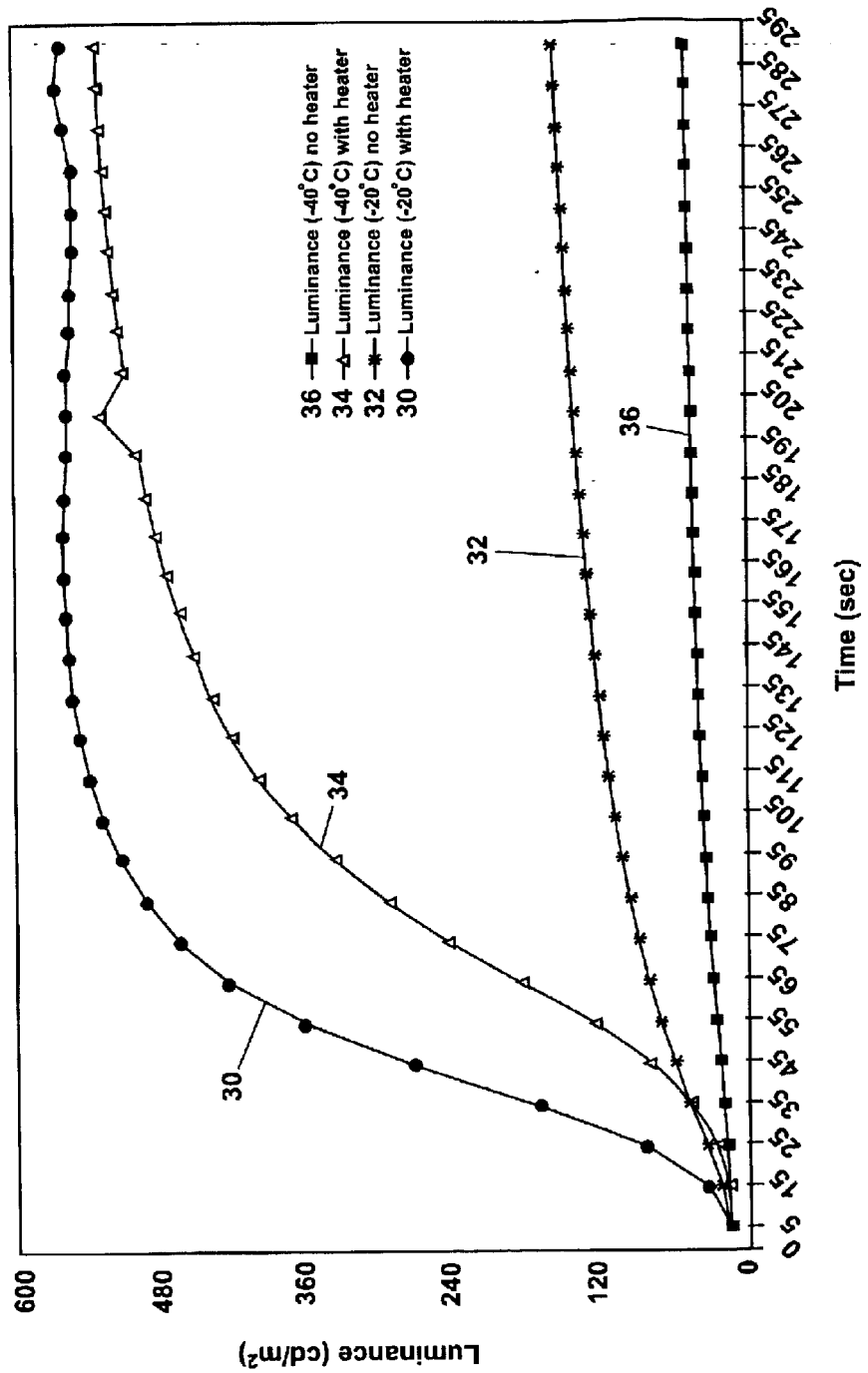
FIG. 5 shows a chart of luminance of LCD incorporating the heating element of the present invention.

The constructed heating element, in combination with a pair of 7 mA CCFLs and an LCD, was tested to ascertain the efficiency of the heating element. FIG. 5 shows the intensity of the light out put through the LCD over time. When the ambient temperature of the tested device was −20° C., the luminance of the heated LCD reached acceptable, i.e., about 300 candela/m2 (cd/m2) in about 45 seconds, as indicated by line 30. In comparison, the luminance of the unheated LCD at −20° C. reached about 140 cd/m$^2$ in about 295 seconds, as indicated by line 32. Furthermore, when the ambient temperature of the tested device was even lower at −40° C., the heated LCD reached acceptable in about 85 seconds, as indicated by line 34. The unheated LCD at −40° C. did not even reach 60 cd/m$^2$ in 295 seconds, as indicated by line 36. Thus, as indicated by the chart, the heating element of the present invention provides a significant advantage over non-heated CCFLs.

While the invention has been specifically described in connection with certain specific embodiments thereof, it is to be understood that this is by way of illustration and not of limitation, and the scope of the appended claims should be construed as broadly as the prior art will permit.

What is claimed is:

1. A system for backlighting a display device, comprising:
   a least one fluorescent lamp; and
   a heating element which does not substantially block light from said lamp that would otherwise reach the display device, wherein said heating element is a resistive material coated on a substrate residing thermally proximate said lamp or on said lamp, wherein said resistive material is a polymer thick film.

2. The system of claim 1, wherein the lamp is located between said substrate and the display device.

3. The system of claim 1, wherein said resistive material is coated on the exterior of said lamp.

4. The system of claim 1, wherein said resistive material is coated on the interior of said lamp.

5. The system of claim 1, wherein said resistive material includes carbon.

6. The system of claim 1, wherein said heating element includes at least two areas of resistive material.

7. The system of claim 1, wherein said heating element includes only one area of resistive material.

8. A display comprising:
   a display device;
   at least one fluorescent lamp adapted to backlight said display device;
   a heating element which does not substantially block light from said lamp that would otherwise reach the display device; and
   optionally including reflectors, diffusers, or optical enhancement films, wherein said heating element is a resistive material coated on a substrate residing thermally proximate said lamp or on said lamp, wherein said resistive material is a polymer thick film.

9. The display of claim 8, wherein the lamp is located between said substrate and the display device.

10. The display of claim 8, wherein said resistive material is coated on the exterior of said lamp.

11. The display of claim 8, wherein said resistive material is coated on the interior of said lamp.

12. The display of claim 8, wherein said resistive material includes carbon.

13. The display of claim 8, wherein said heating element includes at least two areas of resistive material.

14. The display of claim 8, wherein said heating element includes only one area of resistive material.

* * * * *